United States Patent
Page

(10) Patent No.: US 12,409,016 B2
(45) Date of Patent: Sep. 9, 2025

(54) ORTHODONTIC CORD SEGMENT METHODS

(71) Applicant: Ruth A. Page, Aliso Viejo, CA (US)

(72) Inventor: Ruth A. Page, Aliso Viejo, CA (US)

( * ) Notice: Subject to any disclaimer, the term of this patent is extended or adjusted under 35 U.S.C. 154(b) by 0 days.

(21) Appl. No.: 17/954,323

(22) Filed: Sep. 27, 2022

(65) Prior Publication Data
US 2023/0020785 A1    Jan. 19, 2023

Related U.S. Application Data

(63) Continuation of application No. 16/379,353, filed on Apr. 9, 2019, now abandoned.

(60) Provisional application No. 62/654,613, filed on Apr. 9, 2018.

(51) Int. Cl.
*A61C 7/12* (2006.01)

(52) U.S. Cl.
CPC .................................. *A61C 7/125* (2013.01)

(58) Field of Classification Search
CPC .. A61C 7/125; A61C 7/00; A61C 5/80; A61C 5/82; A61C 5/85; A61C 5/88; A61C 5/90; A63B 23/032; A63B 71/085; A63B 2071/086; A63B 2071/088; A45D 44/22
USPC .............................................................. 433/2
See application file for complete search history.

(56) References Cited

U.S. PATENT DOCUMENTS

| | | | | |
|---|---|---|---|---|
| 2,152,391 A * | 3/1939 | Spahn | ...................... | A61C 7/08 433/136 |
| 2,396,203 A * | 3/1946 | Robinson | ............. | A61C 19/001 606/201 |
| 2,842,119 A * | 7/1958 | Walton | ................... | A45D 44/22 606/204.15 |
| 3,071,476 A * | 1/1963 | Werft | ..................... | A61C 17/00 426/115 |
| 3,444,858 A * | 5/1969 | Higham | ................ | A61M 35/00 206/820 |
| 4,196,902 A * | 4/1980 | Borriello | .............. | A63B 23/032 482/11 |
| 4,372,314 A * | 2/1983 | Wall | .................... | A61F 13/2074 433/136 |
| 4,482,321 A * | 11/1984 | Tabor | ...................... | A61C 9/00 433/71 |

(Continued)

FOREIGN PATENT DOCUMENTS

EP       2700396 A2 *  2/2014  .......... A61C 19/063

OTHER PUBLICATIONS

AnySeals, "Cord", https://www.anyseals.com/en/api/getDownloade/?pdf=ep_en_aus.pdf (Year: 2017).*

(Continued)

*Primary Examiner* — Thomas C Barrett
*Assistant Examiner* — Holly T. To
(74) *Attorney, Agent, or Firm* — Total Awareness Consulting Services; Robert Winslow

(57) ABSTRACT

An elongated cord segment is inserted into a mouth. The elongated cord segment comprises at least one non-absorbent food-grade material. The elongated cord segment having a cross-sectional shape consisting of convex surfaces, and a uniform density. The elongated cord segment is positioned to cause separation between orthodontic hardware and at least one of the following: cheek tissue inside the mouth, or lip tissue inside the mouth, without the elongated cord segment contacting the orthodontic hardware.

12 Claims, 9 Drawing Sheets

(56) References Cited

U.S. PATENT DOCUMENTS

| | | | | |
|---|---|---|---|---|
| 4,512,740 | A * | 4/1985 | Kurz | A61C 7/125 433/22 |
| 4,559,013 | A * | 12/1985 | Amstutz | A61C 7/125 433/22 |
| 4,609,348 | A * | 9/1986 | Rowland | A61C 7/125 433/2 |
| 4,869,669 | A * | 9/1989 | Grubbs | A61C 5/00 433/140 |
| 4,913,654 | A * | 4/1990 | Morgan | A61C 7/125 433/11 |
| 5,540,588 | A * | 7/1996 | Earle | A61C 9/0033 433/136 |
| 5,573,400 | A * | 11/1996 | Asher | A61C 5/88 433/136 |
| 5,662,471 | A * | 9/1997 | Fogerty | A61C 7/125 433/22 |
| 5,749,729 | A * | 5/1998 | Skinner | A61F 13/2074 433/136 |
| 5,833,459 | A * | 11/1998 | Graham | A61C 19/001 433/136 |
| 5,938,435 | A * | 8/1999 | Raspino, Jr. | A61C 7/125 433/22 |
| 5,938,437 | A * | 8/1999 | DeVincenzo | A61C 7/00 433/18 |
| 6,003,515 | A * | 12/1999 | Maness | A61C 5/90 128/857 |
| 6,328,756 | B1 * | 12/2001 | Amernick | A45D 44/22 606/204.15 |
| 6,830,590 | B1 * | 12/2004 | Palahnuk | A61F 2/0059 433/136 |
| 7,090,492 | B2 * | 8/2006 | Rodriguez del Val | A61C 19/00 433/136 |
| 8,795,636 | B2 | 8/2014 | Jablow | |
| 8,936,026 | B2 | 1/2015 | Hannapel et al. | |
| 9,936,792 | B2 * | 4/2018 | Bruce | A45D 44/22 |
| 9,987,102 | B2 | 6/2018 | Hannapel et al. | |
| 11,083,544 | B1 * | 8/2021 | Silver | C08J 7/056 |
| 11,744,679 | B1 * | 9/2023 | Anagnos | A61C 7/125 433/8 |
| 11,786,346 | B2 * | 10/2023 | Coreil | A61C 5/20 433/177 |
| D1,004,099 | S * | 11/2023 | Epstein | D24/176 |
| 2003/0023313 | A1 * | 1/2003 | Byers | A45D 44/22 264/222 |
| 2003/0054320 | A1 * | 3/2003 | Val | A61C 3/00 433/218 |
| 2003/0170590 | A1 * | 9/2003 | Heck | A61C 5/90 433/140 |
| 2004/0138699 | A1 * | 7/2004 | Lish | A45D 44/22 606/204.35 |
| 2005/0175963 | A1 * | 8/2005 | Bruce | A45D 44/22 433/140 |
| 2006/0008778 | A1 * | 1/2006 | Rosenberg | A45D 44/22 433/229 |
| 2006/0257331 | A1 * | 11/2006 | Dulin | A61K 9/0063 424/49 |
| 2008/0275482 | A1 * | 11/2008 | Bruce | A45D 44/22 606/191 |
| 2008/0280245 | A1 * | 11/2008 | Bitsack | A61C 5/90 433/23 |
| 2011/0136071 | A1 * | 6/2011 | Levens | A61C 7/125 433/13 |
| 2011/0315151 | A1 * | 12/2011 | Schabert | B65H 37/005 264/157 |
| 2012/0107768 | A1 * | 5/2012 | DiEdwardo | A61C 5/007 433/136 |
| 2012/0199138 | A1 * | 8/2012 | Hannapel | A61C 7/125 128/859 |
| 2012/0260924 | A1 * | 10/2012 | Foster | A63B 71/085 128/861 |
| 2012/0322029 | A1 * | 12/2012 | Foos | A61C 5/80 433/138 |
| 2013/0089584 | A1 * | 4/2013 | Jager Lezer | A61Q 1/00 132/320 |
| 2013/0196281 | A1 * | 8/2013 | Thornton | A61C 19/063 433/8 |
| 2014/0001664 | A1 * | 1/2014 | Anderson | A61C 5/85 264/16 |
| 2015/0079532 | A1 * | 3/2015 | Pechersky | A61C 7/08 433/2 |
| 2015/0125805 | A1 * | 5/2015 | Hannapel | A61C 7/125 433/24 |
| 2015/0209120 | A1 * | 7/2015 | Hannapel | A61C 7/125 427/2.29 |
| 2015/0224361 | A1 * | 8/2015 | Ohanessian | A63B 23/032 482/11 |
| 2017/0086944 | A1 * | 3/2017 | Hulwi | A61C 7/303 |
| 2018/0214762 | A1 * | 8/2018 | Aminia | A61C 19/063 |
| 2021/0322135 | A1 * | 10/2021 | Thai | A61C 5/85 |
| 2022/0323270 | A1 * | 10/2022 | Manaois | A61F 13/2008 |
| 2023/0029969 | A1 * | 2/2023 | Epstein | A61C 7/12 |
| 2024/0023799 | A1 * | 1/2024 | Klug | A61B 1/24 |
| 2024/0216108 | A1 * | 7/2024 | Epstein | A61K 8/0216 |

OTHER PUBLICATIONS

Giovanni Modesto Vieira, "Protein biomarkers of external root resorption: A new protein extraction protocol. Are we going in the right direction?", https://www.researchgate.net/publication/271599339_Protein_biomarkers_of_external_root_resorption_A_new_protein_extra (Year: 2014).*

Dr. Manisha Kamal, "Lower Lip Sucki Ng Ha Bit Treated Wi Tha Lip Bumper Appliance" (Year: 2022).*

* cited by examiner

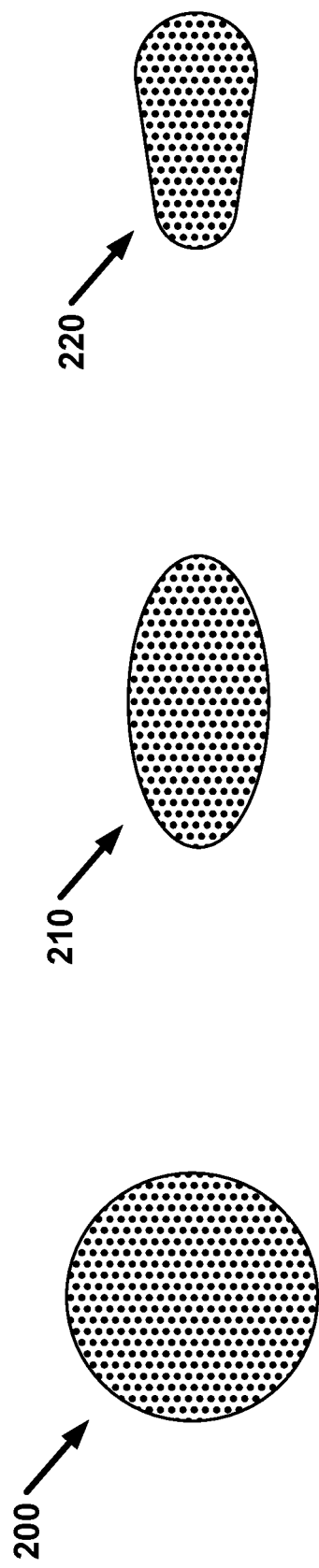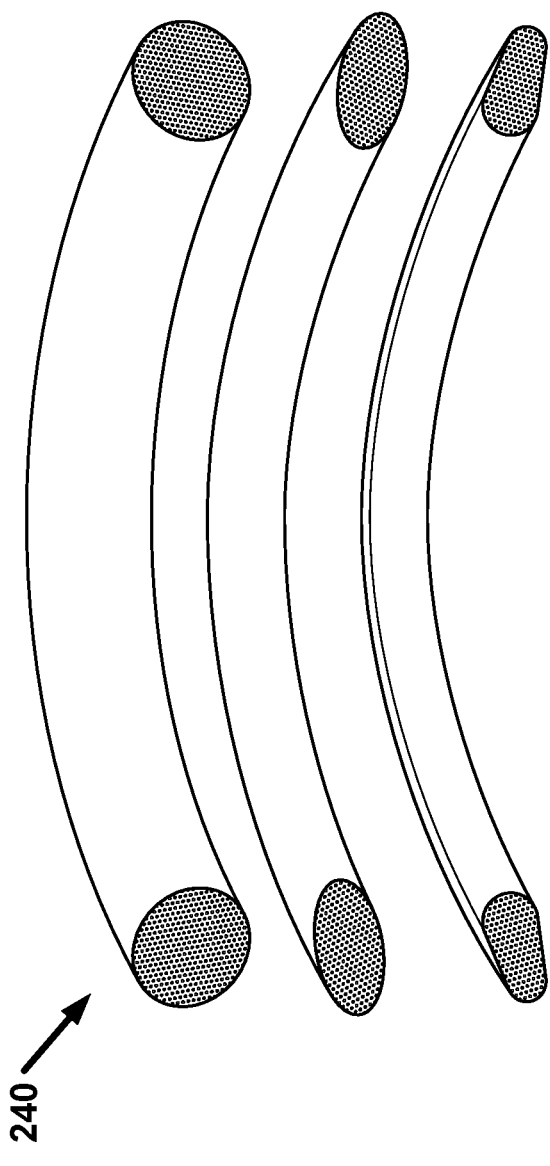

ORTHODONTIC CORD SEGMENT METHODS

CROSS-REFERENCE TO RELATED APPLICATIONS

This application is a continuation of U.S. Nonprovisional application Ser. No. 16/379,353, filed Apr. 9, 2019, which claims the benefit of U.S. Provisional Application No. 62/654,613, filed Apr. 9, 2018, which are all hereby incorporated by reference in their entirety.

BACKGROUND

In many cases, orthodontic hardware may cause pain and/or irritation when contacted by tissue inside the mouth. Examples of tissue include cheek tissue and lip tissue.

Many patients with orthodontic hardware may be given absorbent cotton rolls (may also be referred to as dental rolls) to cause separation between the orthodontic hardware and the tissue. Many cotton rolls may be absorbent, trapping food or liquid consumed by the patient, and/or absorbing bacteria. Many cotton rolls may only be offered in a specific diameter. Many cotton rolls may only be offered in a specific length. Many cotton rolls may be uncomfortable to wear for long durations. The surface of many cotton rolls may snag on the orthodontic hardware. Many cotton rolls may have a coating which may stick to the tissue and cause painful sloughing or ulcers when removed.

Many patients with orthodontic hardware may be given orthodontic wax (may also be referred to as dental wax) or medical-grade silicone dots to cover pieces of orthodontic hardware causing the pain and/or irritation. Installing orthodontic wax or medical-grade silicone dots over each piece of orthodontic hardware that causes the pain and/or irritation may be time consuming. In many cases, the orthodontic wax or medical-grade silicone dots may fall off the orthodontic hardware. In many cases, patients may be required to remove the orthodontic wax or medical-grade silicone dots prior to consuming food and or fluid. In these cases, patients may be required to reinstall orthodontic wax or medical-grade silicone dots an additional time. Orthodontic wax may absorb bacteria. Pieces of orthodontic wax or medical-grade silicone dots may be easy to swallow accidentally. Pieces of orthodontic wax or medical-grade silicone dots may clog plumbing if washed down a drain.

BRIEF DESCRIPTION OF THE SEVERAL VIEWS OF THE DRAWINGS

FIGS. 2A, 2B, and 2C illustrate example cross-sections of elongated cord segments as per an aspect of the disclosure.

FIG. 2D illustrates example elongated cord segments of various cross-sectional shapes as per an aspect of the disclosure.

DETAILED DESCRIPTION OF EMBODIMENTS

Figure 1A:
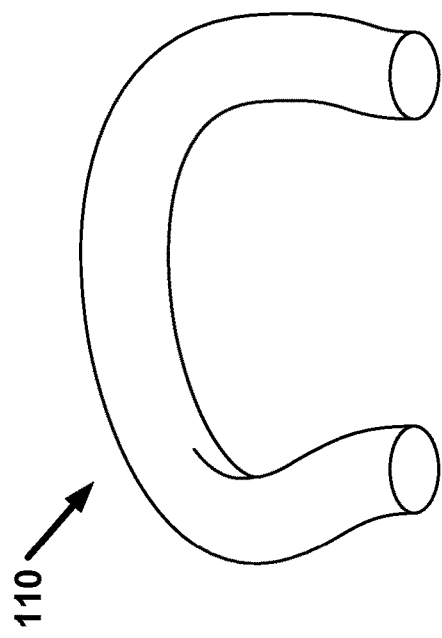
FIGS. 1A, 1B, 1C, and 1D illustrate example elongated cord segments as per an aspect of the disclosure.
Figure 1B:
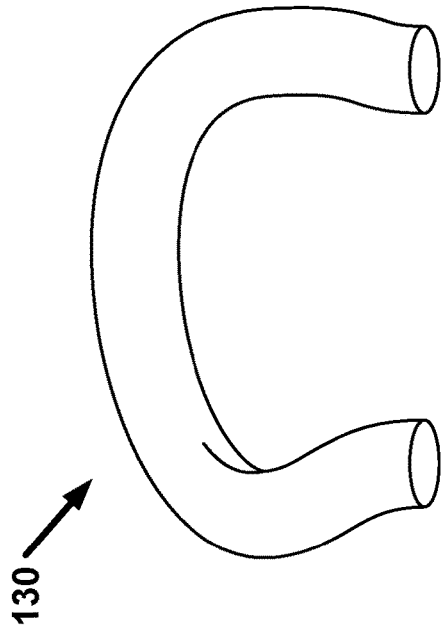
Figure 1C:
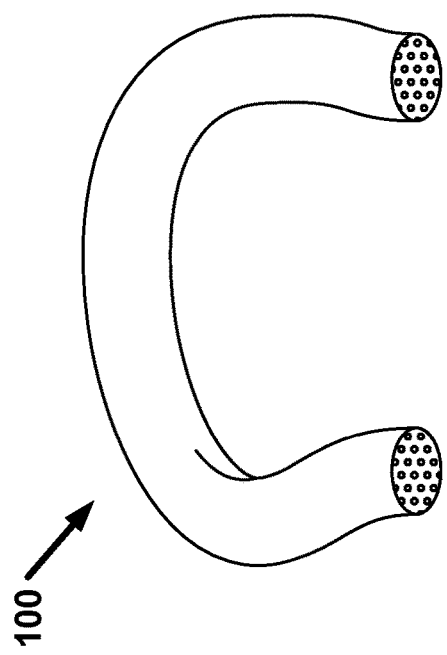
Figure 1D:
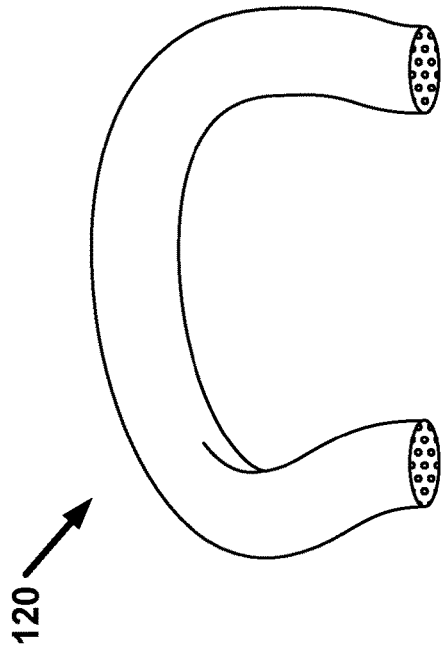

Embodiments comprise elongated cord segment(s) configured to cause separation between orthodontic hardware and tissue inside the mouth of a user.

According to an embodiment, an elongated cord segment may comprise at least one non-absorbent food-grade material. The elongated cord segment may be referred to as an elongated rope segment. The at least one non-absorbent food-grade material may comprise at least one medical grade and/or FDA (Food and Drug Administration) grade non-absorbent food-grade material. The at least one non-absorbent food-grade material may be fully cured or finished. The at least one non-absorbent food-grade material may be non-marking. The at least one non-absorbent food-grade material may be synthetic. The elongated cord segment may comprise a uniform density. The elongated cord segment may comprise a first shape. The first shape may be mechanically configured, when fitted in a mouth of a user, to cause separation between orthodontic hardware and at least one of the following: cheek tissue inside the mouth, or lip tissue inside the mouth. The orthodontic hardware may be mounted on at least one tooth of the user. The orthodontic hardware may comprise a bracket, buccal tube, wire, retainer, aligner, band, crown, spring, pin, combinations thereof, and/or the like. The elongated cord segment may comprise a first length. The first length may be relative to at least a portion of a span of the orthodontic hardware. The first length may be configured to span a range of one tooth to an entire jawline. The elongated cord segment may be reusable.

According to an embodiment, at least one non-absorbent food-grade material may comprise at least one polymer and/or at least one synthetic rubber. An example of a polymer is silicone. An example of a synthetic rubber is Ethylene Propylene Diene Monomer (EPDM).

According to an embodiment, at least one non-absorbent food-grade material may comprise at least one non-polymer.

According to an embodiment, an elongated cord segment may comprise a closed cell foam. An elongated cord segment may comprise a closed cell sponge. An elongated cord segment may comprise a closed cell foam sponge. An elongated cord segment may comprise an open cell foam. An elongated cord segment may comprise an open cell sponge. An elongated cord segment may comprise an open cell foam sponge. An elongated cord segment may be compressible. An elongated cord segment may be compression set resistant. An elongated cord segment may be recyclable.

According to an embodiment, a uniform density may comprise a medium density. The medium density may, for example, correspond to a Shore hardness type 00 in the range of 10 to 85. The medium density may, for example, correspond to a Shore hardness type A in the range of 0 to 55.

According to an embodiment, an elongated cord segment may be flexible. The elongated cord segment may be at least partially formed to a shape of a human gum line.

According to an embodiment, a cross-section of a first shape may comprise a round shape. A cross-section of a first shape may comprise an elliptical shape. A cross-section of a first shape may comprise an oval shape.

FIGS. 1A, 1B, 1C, and 1D illustrate example elongated cord segments (100, 110, 120, and 130) as per an aspect of various embodiments. Elongated cord segments (for example, 100 and 120) may comprise open cell structures. Elongated cord segments (for example, 110 and 130) may comprise closed cell structures. Elongated cord segments (for example, 100 and 110) may comprise a round cross-section. Elongated cord segments (for example, 120 and 130) may comprise an elliptical cross-section. Persons skilled in the art will recognize that a non-absorbent material employed to create an open cell structure (for example, open cell foam, open cell sponge, or open cell foam sponge) may not absorb and/or may be resistant to absorbing foreign particles even though foreign particles may be trapped in one or more open cells.

FIGS. 2A, 2B, and 2C illustrate example cross-sections (200, 210, and 220) of elongated cord segments as per an aspect of various embodiments. Example cross-section 200 may comprise a round shape. Example cross-section 210 may comprise an elliptical shape. Example cross-section 220 may comprise an oval shape.

According to an embodiment, a cross-sectional diameter of a first shape may be within a range of, for example, 0.15 inch to 0.75 inch.

According to an embodiment, a major axis of a cross-section of a first shape may be within a range of, for example, 0.25 inch to 0.75 inch. A minor axis of the cross-section of the first shape may be within a range of, for example, 0.15 inch to 0.5 inch.

According to an embodiment, a first length may, for example, be less than or equal to 6 inches. The first length may be, for example, within a range of 1.5 inches to 6 inches.

According to an example embodiment, an elongated cord segment may comprise an antimicrobial agent. The antimicrobial agent may be part of a non-absorbent food-grade material.

FIG. 2D illustrates example elongated cord segments 240 of various cross-sectional shapes as per an aspect of various embodiments.

According to an embodiment, a package may comprise at least one elongated cord segment. Each of the at least one elongated cord segment may comprise at least one non-absorbent food-grade material. The package may comprise a container. The container may comprise food-grade materials. The container may comprise at least one material that meets FDA approval for food packaging. The container may comprise the at least one elongated cord segment. Examples of a container include a tube, a box, a bag, combinations thereof, and/or the like. The package may comprise instructions for employment of the at least one elongated cord segment. The container may comprise the instructions. The instructions may be attached to the container. The instructions may be located on the container. The instructions may be provided to inform a user to insert an elongated cord segment into a mouth. The instructions may be provided to inform a user to position the elongated cord segment to cause separation between orthodontic hardware and at least one of the following: cheek tissue inside the mouth, or lip tissue inside the mouth. The instructions may be provided to inform a user to position the elongated cord segment facing cheek tissue and/or lip tissue. Cheek tissue may be referred to as buccal mucosa. Upper and lower lip tissue may be referred to as "Labium superius oris" and "Labium inferius oris" respectively. The instructions may be provided to inform a user to orient the elongated cord segment towards or away from a gum. The instructions may be provided to inform a user to position the elongated cord segment along a portion of an upper jaw and/or a lower jaw. The instructions may inform the user to position the elongated cord segment to avoid contact between the elongated cord segment and the orthodontic hardware. The instructions may inform the user to position the elongated cord segment to avoid contact between the elongated cord segment and the orthodontic hardware once the positioning is complete. The instructions may inform the user to cut the elongated cord segment to a desired length. The instructions may inform the user that the elongated cord segment is washable. The instructions may inform the user to wash the elongated cord segment after use. The elongated cord segment may be dishwasher safe. The instructions may inform the user to wash the elongated cord segment in a dishwasher. The instructions may be accessible via a hyperlink. The instructions may be indirectly accessible via a hyperlink. The instructions may be illustrated through at least one drawing and/or image. The instructions may be presented in a video.

Figure 3B:
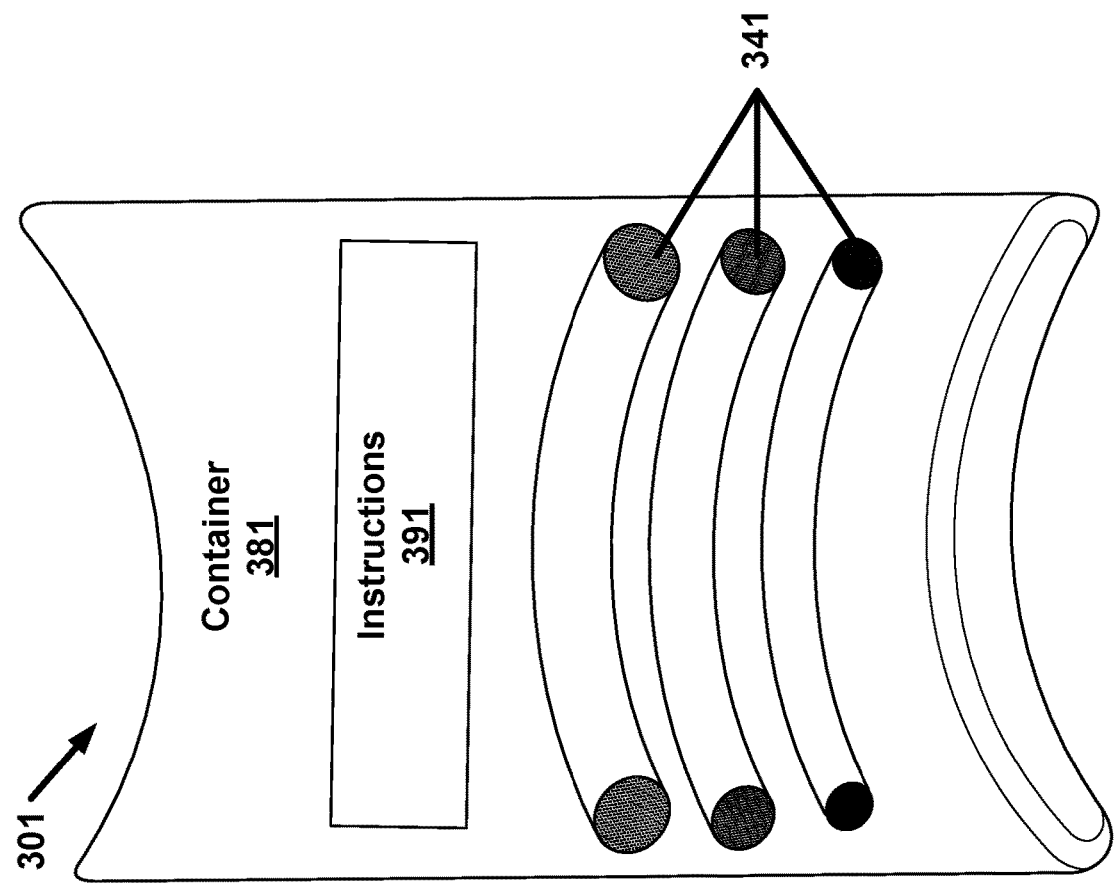
FIGS. 3A and 3B illustrate example packages as per aspects of the disclosure.
Figure 3A:
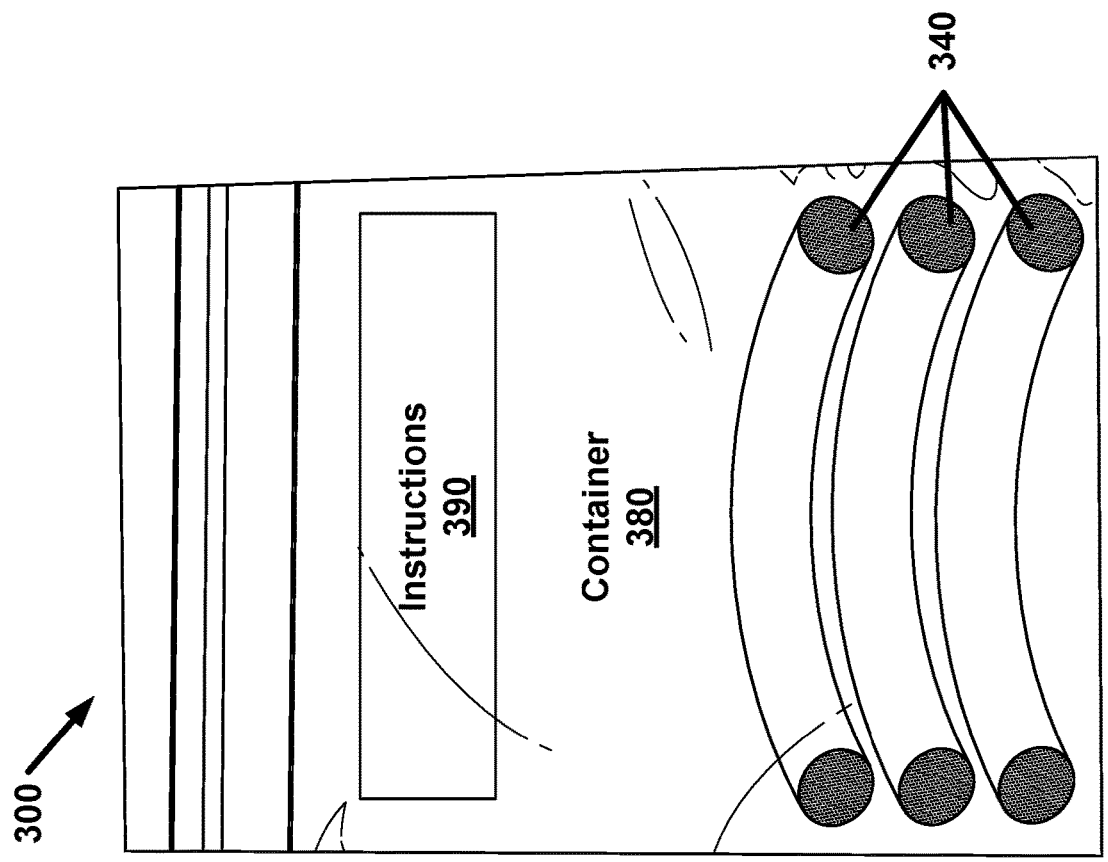

FIG. 3A illustrates an example package 300 as per an aspect of an embodiment. The package 300 may comprise at least one elongated cord segment 340. The at least one elongated cord segment 340 may comprise a plurality of similarly shaped and similarly sized elongated cord segments (as shown). The package 300 may comprise a container 380. The container 380 may comprise a plastic bag. The plastic bag may be configured to be reclosable. The package 300 may comprise instructions 390.

FIG. 3B illustrates an example package 301 as per an aspect of an embodiment. The package 301 may comprise at least one elongated cord segment 341. The at least one elongated cord segment 341 may comprise a plurality of cross-sectional diameters (as shown). The package 301 may comprise a container 381. The container 381 may comprise a pillow box. The pillow box may comprise plastic, paper, cardboard, combinations thereof, and/or the like. The package 301 may comprise instructions 391.

Figure 4:
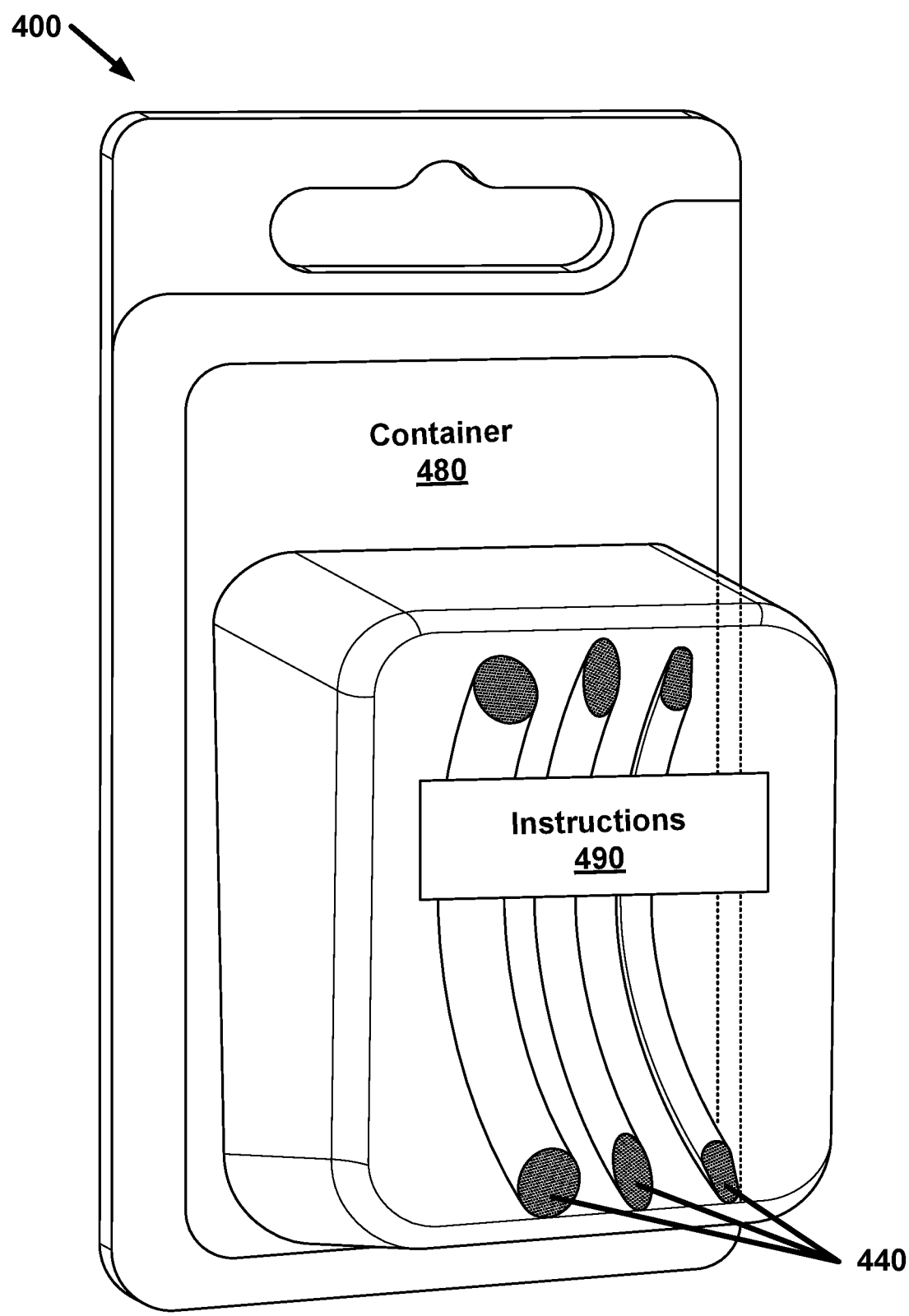
FIG. 4 illustrates an example package as per an aspect of the disclosure.

FIG. 4 illustrates an example package 400 as per an aspect of an embodiment. The package 400 may comprise at least one elongated cord segment 440. The at least one elongated cord segment 440 may comprise a plurality of cross-sectional shapes (as shown). The package 400 may comprise a container 480. The container 480 may comprise a clamshell. The clamshell may comprise plastic, paper, cardboard, combinations thereof, and/or the like. The package 400 may comprise instructions 490.

According to an embodiment, an elongated cord segment may be inserted into a mouth. The elongated cord segment may comprise at least one non-absorbent food-grade material. The elongated cord segment may be positioned to cause separation between orthodontic hardware and at least one of the following: cheek tissue inside the mouth, or lip tissue inside the mouth. The elongated cord segment may be cut to a desired length. The elongated cord segment may be cut without impacting a non-absorbent characteristic of at least one food-grade material. The elongated cord segment may be cut for each individual user based on: a span of orthodontic hardware, and/or length of gum line. The elongated cord segment may be positioned to avoid contact between the elongated cord segment and the orthodontic hardware. The elongated cord segment may be positioned to avoid contact between the elongated cord segment and the orthodontic hardware once positioning is complete. Contact between the elongated cord segment and the orthodontic hardware during installation and/or removal of the elongated cord segment may be acceptable.

Figure 5:
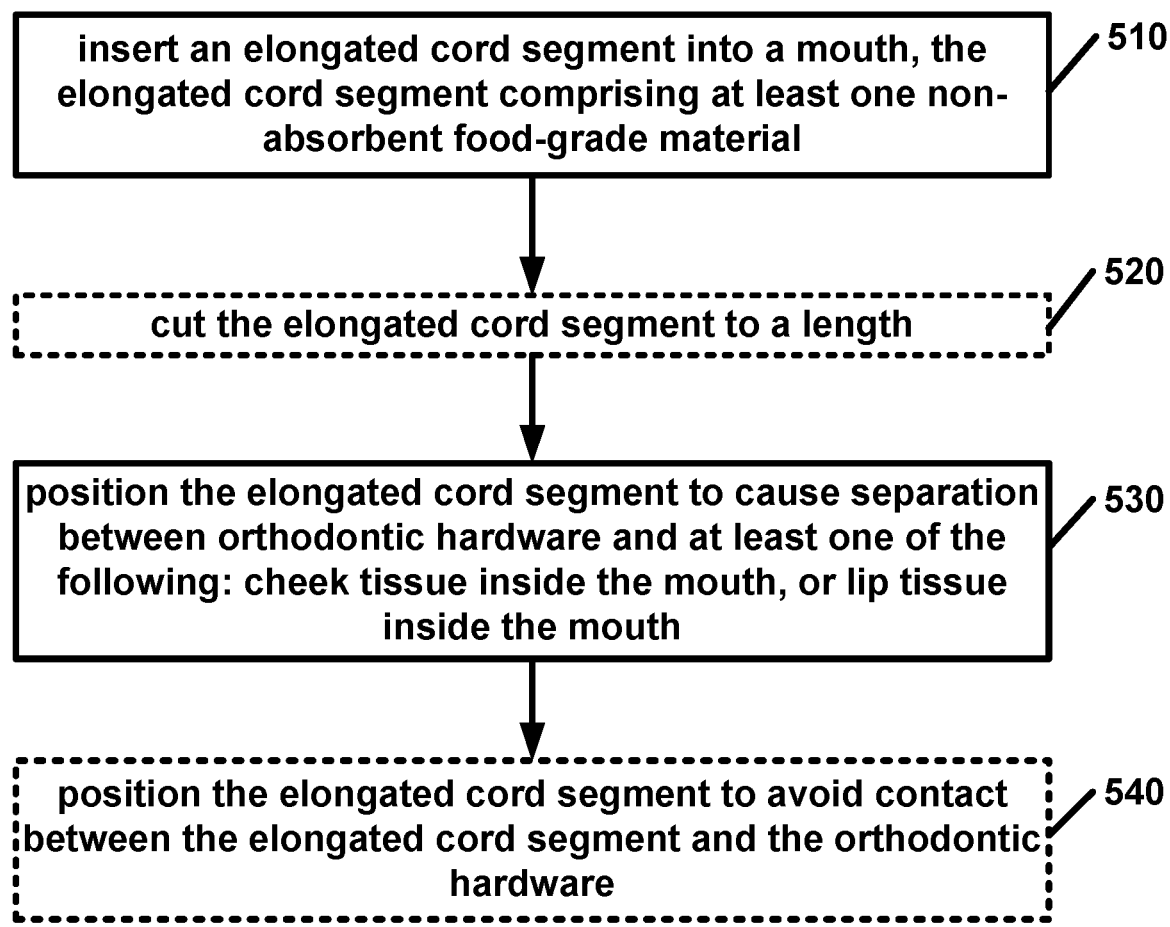
FIG. 5 is an example flow diagram of employing an elongated cord segment as per an aspect of the disclosure.

FIG. 5 is an example flow diagram of employing an elongated cord segment as per an aspect of various embodiments. An elongated cord segment may be inserted into a mouth at 510. The elongated cord segment may comprise at least one non-absorbent food-grade material. The elongated cord segment may be cut to a length at 520. The elongated cord segment may be positioned to cause separation between orthodontic hardware and at least one of the following: cheek tissue inside the mouth, or lip tissue inside the mouth at 530. The elongated cord segment may be positioned to avoid contact between the elongated cord segment and the orthodontic hardware at 540.

According to an embodiment, manufacture of at least one elongated cord segment may comprise combining at least one substance into an extrusion mixture. At least one foaming agent may be injected into the extrusion mixture. The extrusion mixture may be forced through a die to form an extrudate of a first shape. The extrudate may be formed through extrusion. The extrudate may be formed employing an extruder. The extrudate may be cured to form an elongated cord. The elongated cord may comprise a non-absorbent food-grade material. The elongated cord may comprise at least one of a plurality of colors. The plurality of colors may include human gum tissue colors. Curing may comprise heating and/or cooling. Heating may comprise a plurality of stages at a plurality of temperatures. Curing may cause skin to form on an exterior surface of the extrudate. The elongated cord may be cut into the at least one elongated cord segment. Each of the at least one elongated cord segment may comprise a first length. Additional curing may take place after cutting. The first shape may be mechanically configured, when fitted in a mouth, to cause separation between orthodontic hardware and at least one of the following: cheek tissue inside the mouth, or lip tissue inside the mouth. One or more of the above disclosed processes may be performed in a clean room.

Figure 6:
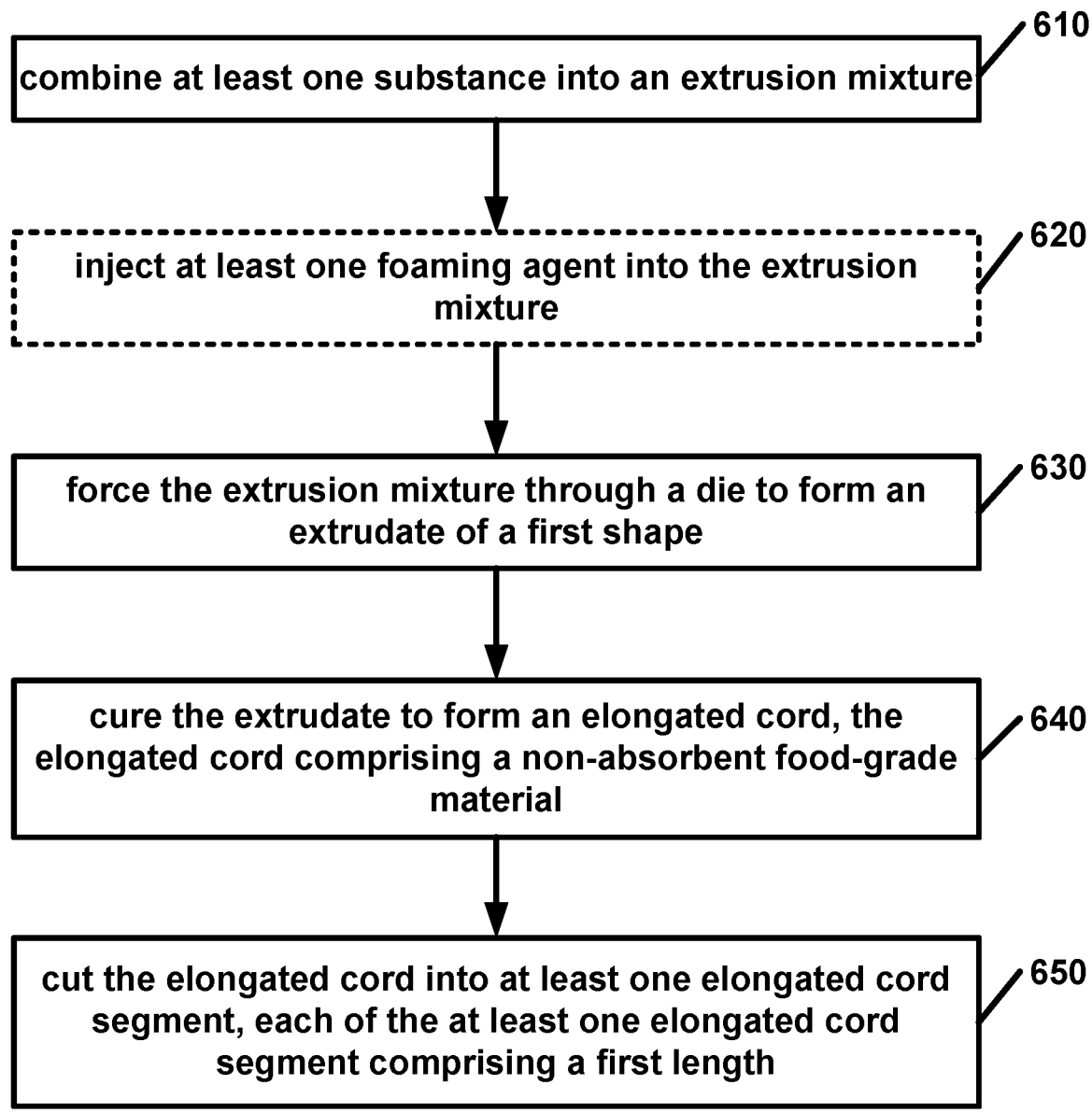
FIG. 6 is an example flow diagram of manufacturing at least one elongated cord segment as per an aspect of the disclosure.

FIG. 6 is an example flow diagram of manufacturing at least one elongated cord segment as per an aspect of various embodiments. At least one substance may be combined into an extrusion mixture at 610. At least one foaming agent may be injected into the extrusion mixture at 620. The extrusion mixture may be forced through a die to form an extrudate of a first shape at 630. The extrudate may be cured to form an elongated cord at 640. The elongated cord may comprise a non-absorbent food-grade material. The elongated cord may be cut into the at least one elongated cord segment at 650. Each of the at least one elongated cord segment may comprise a first length.

According to an embodiment, manufacture of at least one elongated cord segment may comprise combining at least one substance into a molding mixture. The molding mixture may comprise at least one foaming agent. At least a portion of the molding mixture may be placed into a portion of at least one first mold cavity. Each of the at least one first mold cavity may comprise a first compression mold shape. The molding mixture may be compressed into the at least one first mold cavity through employment of at least one second mold cavity. Each of the at least one second mold cavity may comprise a second compression mold shape. The molding mixture may be heated. The at least one first mold cavity and/or the at least one second mold cavity may be heated. The first compression mold shape and the second compression mold shape may comprise the same shape. The molding mixture may be at least partially cured. Curing may comprise cooling a heated mixture. Curing may comprise heating and cooling the at least one first and/or the at least one second mold cavity. Heating may comprise a plurality of stages at a plurality of temperatures. The at least one elongated cord segment may be released from the at least one first mold cavity and/or the at least one second mold cavity. Additional curing may take place after releasing. The at least one elongated cord segment may comprise a non-absorbent food-grade material. The at least one elongated cord segment may comprise at least one of a plurality of colors. The plurality of colors may include human gum tissue colors. Each of the at least one elongated cord segment may comprise a first length. Flash may be removed from the at least one elongated cord segment. One or more of the above disclosed processes may be performed in a clean room.

Figure 7:
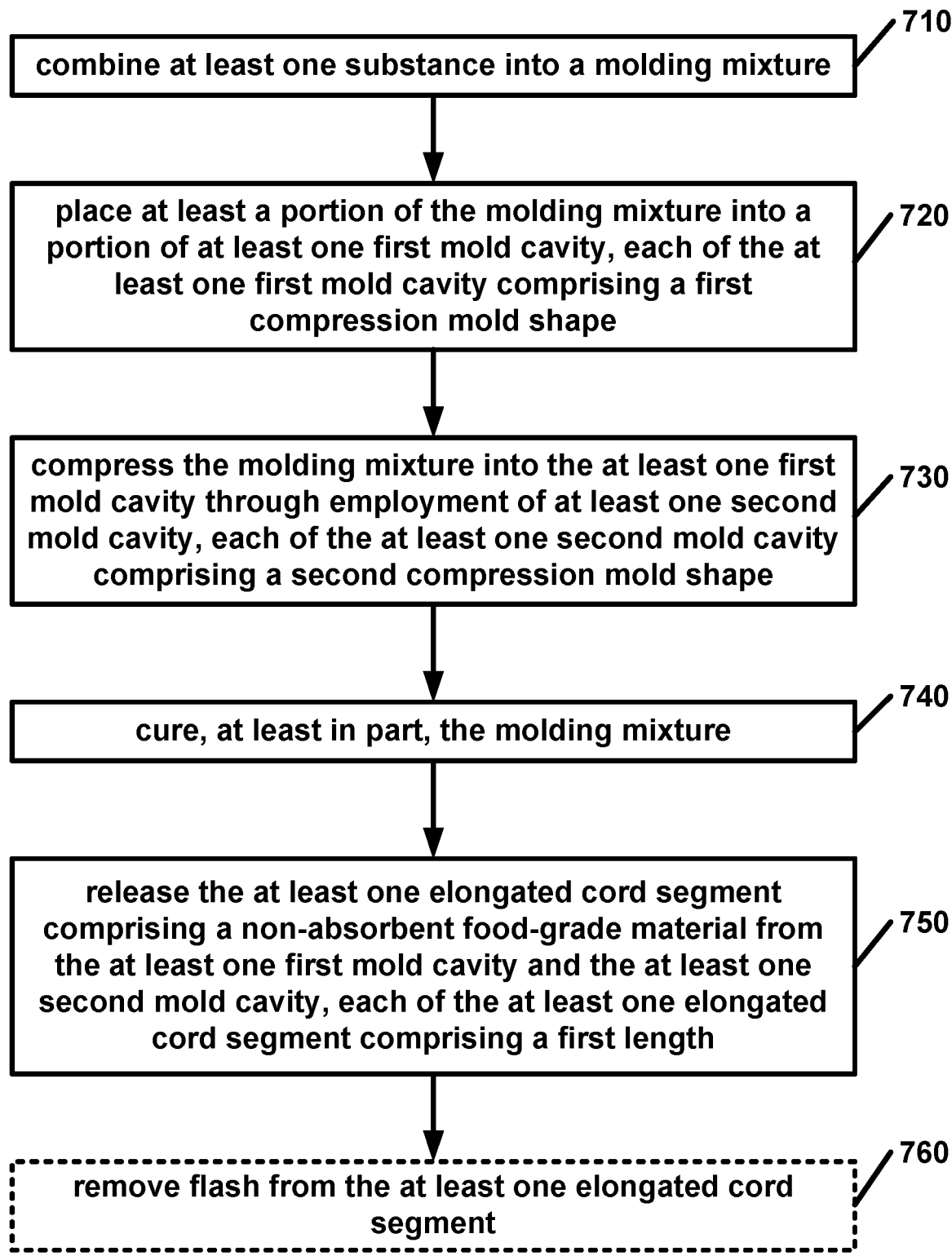
FIG. 7 is an example flow diagram of manufacturing at least one elongated cord segment as per an aspect of the disclosure.

FIG. 7 is an example flow diagram of manufacturing at least one elongated cord segment as per an aspect of various embodiments. At least one substance may be combined into a molding mixture at 710. At least a portion of the molding mixture may be placed into a portion of at least one first mold cavity at 720. Each of the at least one first mold cavity may comprise a first compression mold shape. The molding mixture may be compressed into the at least one first mold cavity through employment of at least one second mold cavity at 730. Each of the at least one second mold cavity may comprise a second compression mold shape. The molding mixture may be cured, at least in part, at 740. The at least one elongated cord segment may be released at 750. The at least one elongated cord segment may comprise a non-absorbent food-grade material. The at least one elongated cord segment may be released from the at least one first mold cavity and the at least one second mold cavity. Each of the at least one elongated cord segment may comprise a first length. Flash may be removed from the at least one elongated cord segment at 760.

According to an embodiment, manufacture of at least one elongated cord segment may comprise combining at least one substance into a molding mixture. At least a portion of the molding mixture may be injected into at least one injection mold cavity. Each of the at least one injection mold cavity may comprise an injection mold shape. The injection mold shape may comprise the shape of an elongated cord segment. The injection mold cavity may comprise a first plate and a second plate. The first plate and the second plate may be combined to create the shape of the elongated cord segment. The injection mold cavity may comprise a first injection mold cavity and a second injection mold cavity. The first injection mold cavity and the second injection mold cavity may be combined to create the shape of the elongated cord segment. The molding mixture and/or the at least one injection mold cavity may be heated. Heating may comprise a plurality of stages at a plurality of temperatures. The molding mixture may be cured. Curing may comprise cooling a heated molding mixture. Curing may comprise allowing a heated molding mixture to cool. Curing may comprise heating and cooling the at least one injection mold cavity. Curing may comprise allowing at least one heated injection mold cavity to cool. At least one elongated cord segment may be released from the at least one injection mold cavity. Additional curing may take place after releasing. The at least one elongated cord segment may comprise a non-absorbent food-grade material. The at least one elongated cord segment may comprise at least one of a plurality of colors. The plurality of colors may include human gum tissue colors. Each of the at least one elongated cord segment may comprise a first length. Flash may be removed from the at least one elongated cord segment. Examples of flash include a runner, a sprue, and/or the like. One or more of the above disclosed processes may be performed in a clean room.

Figure 8:
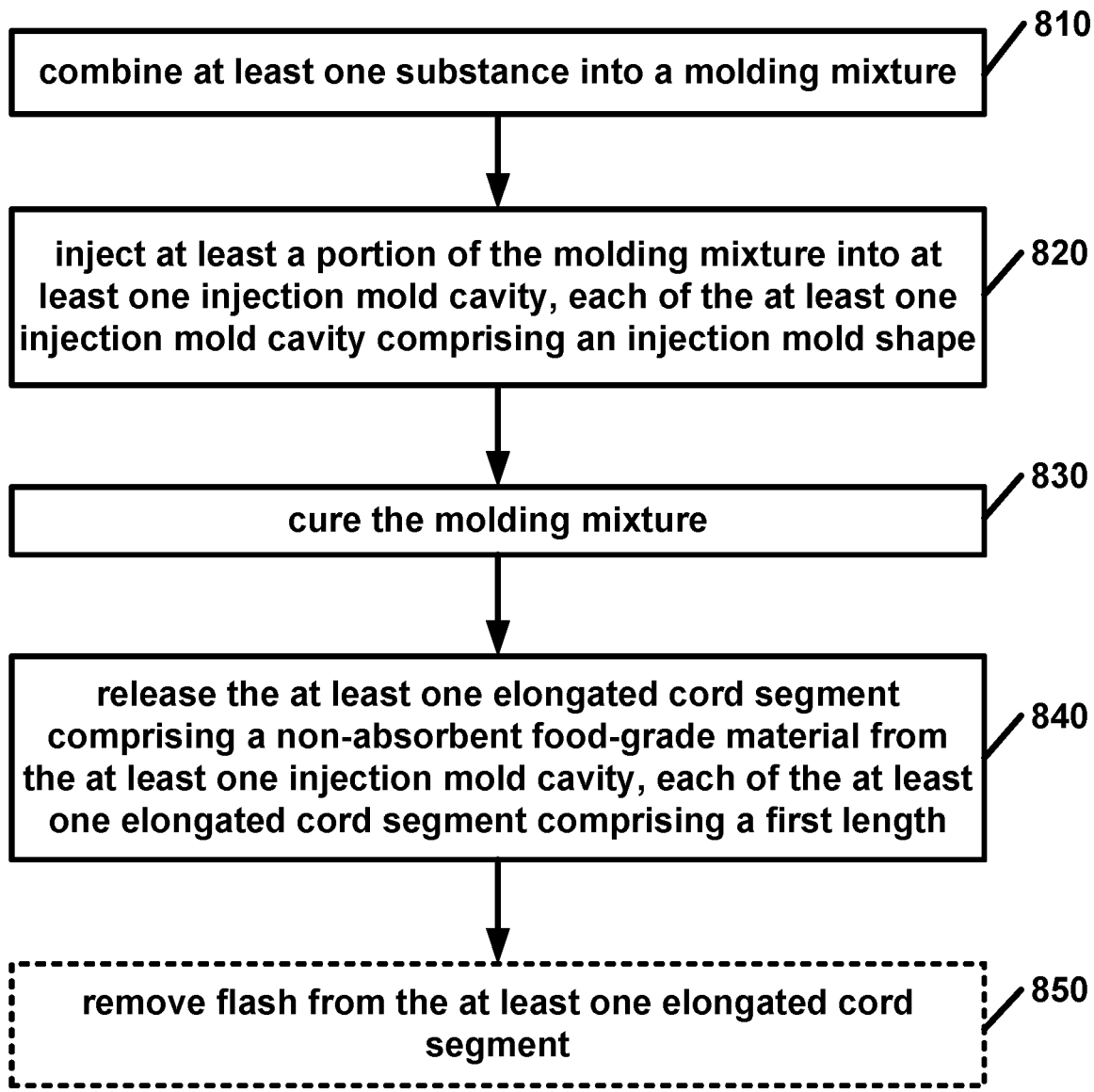
FIG. 8 is an example flow diagram of manufacturing at least one elongated cord segment as per an aspect of the disclosure.

FIG. 8 is an example flow diagram of manufacturing at least one elongated cord segment as per an aspect of various embodiments. At least one substance may be combined into a molding mixture at 810. At least a portion of the molding mixture may be injected into at least one injection mold cavity at 820. Each of the at least one injection mold cavity may comprise an injection mold shape. The molding mixture may be cured at 830. The at least one elongated cord segment may be released from the at least one injection mold cavity at 840. The at least one elongated cord segment may comprise a non-absorbent food-grade material. Each of the at least one elongated cord segment may comprise a first length. Flash may be removed from the at least one elongated cord segment at 850.

According to an embodiment, manufacture of at least one elongated cord segment may comprise combining at least one substance into a molding mixture. At least a portion of the molding mixture may be placed into a pot. The pot may be connected to at least one transfer mold cavity. The at least one transfer mold cavity may be part of a bottom plate. Each of the at least one transfer mold cavity may comprise a transfer mold shape. The transfer mold shape may comprise the shape of an elongated cord segment. The molding mixture may be compressed into the at least one transfer mold cavity. The molding mixture may be compressed through employment of at least one plunger. The at least one plunger may be at least part of a top plate. The molding mixture may be heated. The pot may be heated. The plunger may be heated. The at least one transfer mold cavity may be heated. Heating may comprise a plurality of stages at a plurality of temperatures. The molding mixture may be cured. Curing may comprise cooling a heated molding mixture. Curing may comprise allowing a heated molding mixture to cool. Curing may comprise heating and cooling the pot. Curing may comprise heating and cooling the plunger. Curing may comprise heating and cooling the at least one transfer mold cavity. Curing may comprise allowing the pot, the plunger, and/or the at least one transfer mold cavity to cool. The at least one elongated cord segment may be released from the at least one transfer mold cavity. Additional curing may take place after releasing. The at least one elongated cord segment may comprise a non-absorbent food-grade material. The at least one elongated cord segment may comprise at least one of a plurality of colors. The plurality of colors may include human gum tissue colors. Each of the at least one elongated cord segment may comprise a first length. Flash may be removed from the at least one elongated cord segment. Examples of flash include a runner, a sprue, and/or the like. One or more of the above disclosed processes may be performed in a clean room.

Figure 9:
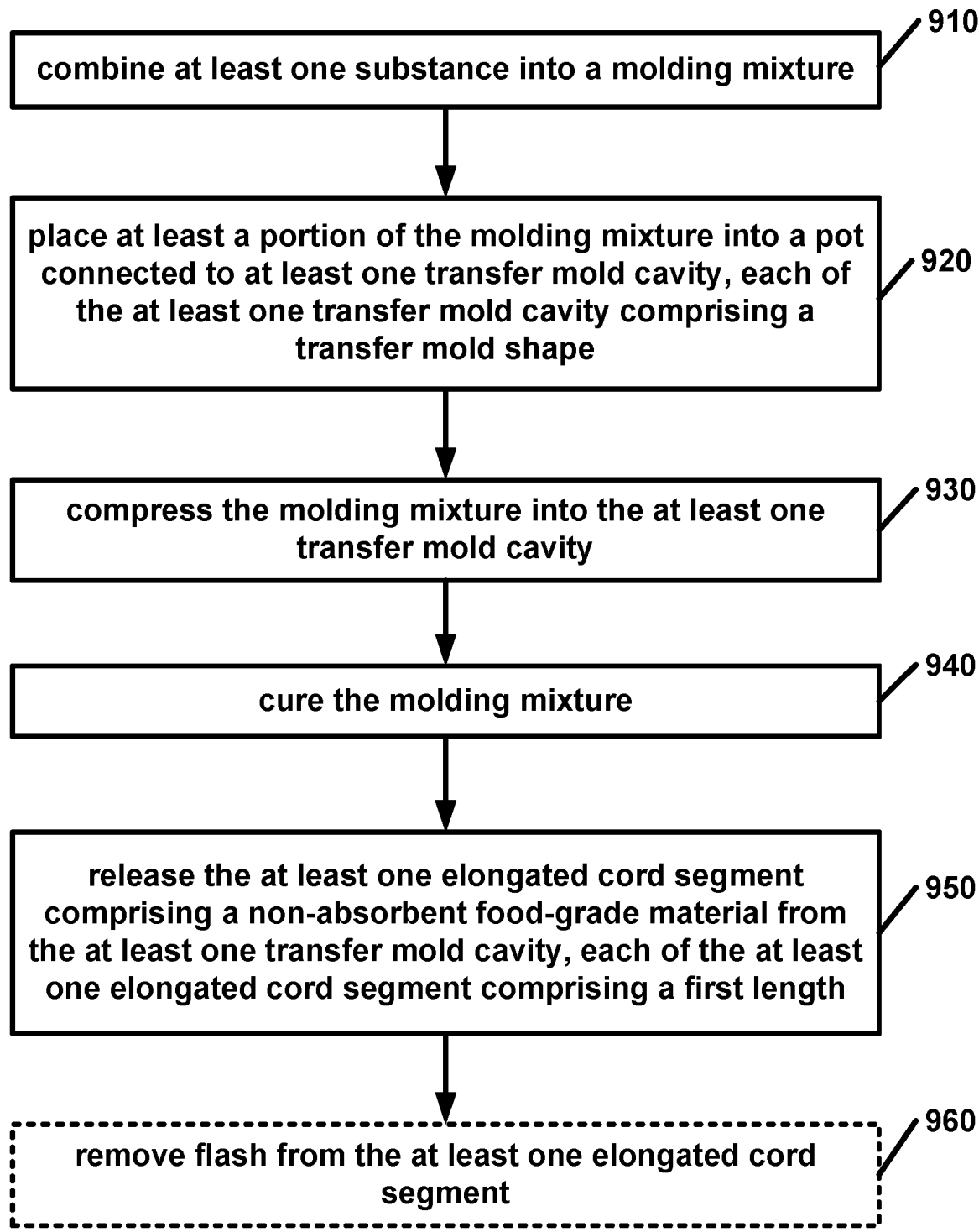
FIG. 9 is an example flow diagram of manufacturing at least one elongated cord segment as per an aspect of the disclosure.

FIG. 9 is an example flow diagram of manufacturing at least one elongated cord segment as per an aspect of various embodiments. At least one substance may be combined into a molding mixture at 910. At least a portion of the molding mixture may be placed into a pot connected to at least one transfer mold cavity at 920. Each of the at least one transfer mold cavity may comprise a transfer mold shape. The molding mixture may be compressed into the at least one transfer mold cavity at 930. The molding mixture may be cured at 940. The at least one elongated cord segment may be released from the at least one transfer mold cavity at 950. The at least one elongated cord segment may comprise a non-absorbent food-grade material. Each of the at least one elongated cord segment may comprise a first length. Flash may be removed from the at least one elongated cord segment at 960.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "a", "an", and "one" are not to be interpreted as "only one". In this specification, the term "may" is to be interpreted as "may, for example." In other words, the term "may" is indicative that the phrase following the term "may" is an example of one of a multitude of suitable possibilities that may, or may not, be employed to one or more of the various embodiments. In this specification, the phrase "based on" is indicative that the phrase following the term "based on" is an example of one of a multitude of suitable possibilities that may, or may not, be employed to one or more of the various embodiments. References to "an" embodiment in this disclosure are not necessarily to the same embodiment.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

In this specification, various embodiments are disclosed. Limitations, features, and/or elements from the disclosed example embodiments may be combined to create further embodiments within the scope of the disclosure.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, an item described as having three optional features may be embodied in seven different ways, namely with just one of the three possible features, with any two of the three possible features or with all three of the three possible features.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   a) inserting an elongated cord segment into a mouth, the elongated cord segment comprising at least one non-absorbent food-grade material and having:
      i) a cross-sectional shape consisting of convex surfaces; and
      ii) a uniform density; and
   b) positioning the elongated cord segment to cause separation between orthodontic hardware and at least one of the following: cheek tissue inside the mouth, or lip tissue inside the mouth, without the elongated cord segment contacting the orthodontic hardware.

2. The method according to claim 1, wherein the elongated cord segment is compressible.

3. The method according to claim 1, wherein the elongated cord segment is compression set resistant.

4. The method according to claim 1, wherein the elongated cord segment is recyclable.

5. The method according to claim 1, wherein a cross-sectional diameter of the elongated cord segment is within a range of 0.15 inch to 0.75 inch.

6. The method according to claim 1, wherein a major axis of a cross-section of the elongated cord segment is within a range of 0.25 inch to 0.75 inch.

7. The method according to claim 1, wherein a minor axis of a cross-section of the elongated cord segment is within a range of 0.15 inch to 0.5 inch.

8. The method according to claim 1, wherein the orthodontic hardware is mounted on at least one tooth in the mouth.

9. The method according to claim 1, wherein the elongated cord segment comprises an antimicrobial agent.

10. The method according to claim 1, wherein the elongated cord segment is configured to be reusable.

11. The method according to claim 1, further comprising cutting the elongated cord segment to length.

12. The method according to claim 11, wherein the length is within a range of 1.5 inches to 6 inches.

* * * * *